(No Model.)
H. N. REID.
FRUIT DRIER.
No. 280,242. Patented June 26, 1883.
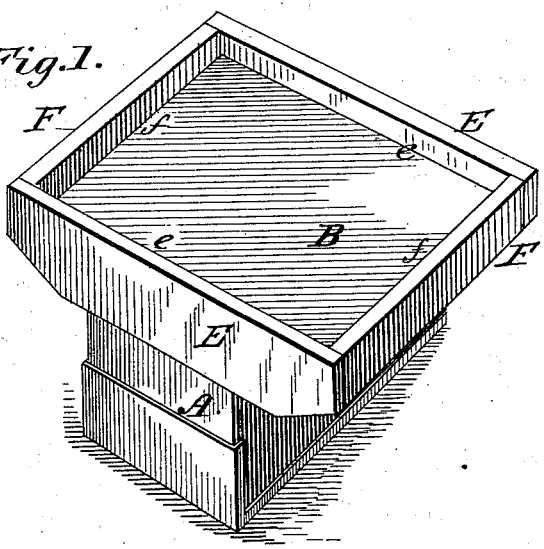
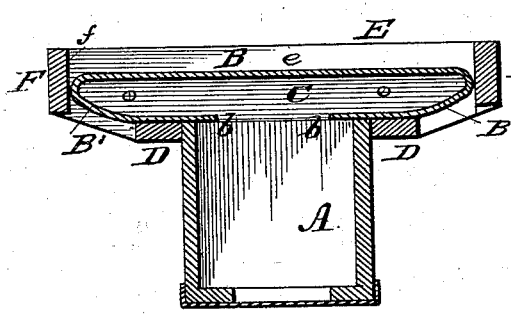
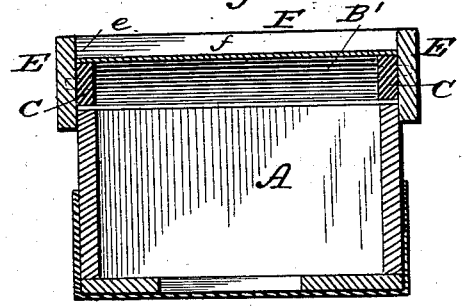
WITNESSES:
Fred. G. Dieterich
Arthur L. Morsell
Harvey N. Reid
INVENTOR.
By Louis Bagger & Co.
ATTORNEYS.
N. PETERS, Photo-Lithographer, Washington, D. C.

United States Patent Office.

HARVEY N. REID, OF MOUNT STERLING, KENTUCKY.

FRUIT-DRIER.

SPECIFICATION forming part of Letters Patent No. 280,242, dated June 26, 1883.

Application filed April 23, 1883. (No model.)

*To all whom it may concern:*

Be it known that I, HARVEY N. REID, a citizen of the United States, residing at Mount Sterling, in the county of Montgomery and State of Kentucky, have invented certain new and useful Improvements in Fruit-Driers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a perspective view of my improved apparatus for drying fruit. Fig. 2 is a cross-section of the same, illustrating the manner of placing the removable pan upon the boiler, and also showing the detailed construction of the former; and Fig. 3 is a vertical sectional view at right angles to the view shown in Fig. 2.

Similar letters of reference indicate corresponding parts in all the figures.

My invention has relation to devices for drying fruit; and it consists in the detailed construction and arrangement of parts of an apparatus of that class, as hereinafter more fully described and claimed, in which the fruit is dried in a pan heated by steam and adapted to fit over a rectangular boiler which can be placed on any suitable furnace or fire-place.

In the accompanying drawings, A denotes the boiler, which is simply a square or rectangular box, made of sheet-iron, of any desired size. The drying-pan is made by bending a piece of sheet-iron, B, into the shape shown in Fig. 2, over side pieces, C C, which form the inside heads of the steam-chamber within the pan. The bent ends B' B' are secured upon the shaped ends of the inner heads, C, by means of cross-pieces D D, the ends of which impinge upon and are fastened to the outside heads, E E, of the pan. These outside heads, E, project up above the flat sheet-metal top B of the pan, and are connected at opposite ends by cross-pieces F F, so as to form a rim or raised edge surrounding the pan, which prevents the fruit placed upon the top B from falling off. This raised rim (shown at *e f*) should be of sufficient height to provide for covering the fruit placed upon the flat top B, with slats or flat boards placed crosswise upon the rim of the pan, and which in turn may be covered with a piece of canvas, woolen material, or other suitable stuff, to retain the heat, when desired. The cross-pieces D, on the under side of the pan, are placed at such a distance apart that they, when the pan is placed upon the boiler, will fit against opposite sides of the latter, as clearly shown in Fig. 2, and thus prevent the pan from sliding off the boiler, or moving sidewise upon the same, while the end pieces, E, it will be seen, project down from the ends of the boiler, as shown in Fig. 3, and thereby hold the pan firmly in its position. It will also be seen, by reference to Fig. 2, that the inner ends of the bent parts B' project out from the cross-pieces D, on the under side of the pan, so as to form ledges *b b*, which overlap the sides of the boiler, and by which the water of condensation formed within the steam-chamber of the pan is conveyed back into the boiler.

In using this apparatus, the boiler may be used for cooking feed, or for any other purpose, without affecting its usefulness in connection with the removable pan, which can readily be lifted off the boiler whenever it is desired to inspect the contents of the same. It will also be seen that the pan is formed simply by bending a single piece of sheet metal into the proper shape, and holding the same in position by means of the frame-work formed by the parts C, D, E, and F.

Having thus described my invention, I claim and desire to secure by Letters Patent of the United States—

1. The pan for drying fruit by steam, consisting of a sheet-metal plate, B, having bent ends B' B', connected to and held in place by the frame composed of the parts C, D, E, and F, arranged substantially in the manner and for the purpose shown and set forth.

2. In a fruit-drier, the combination of the boiler A and removable pan, consisting of the sheet-metal plate B, having bent ends B', formed with overlapping ledges *b*, inner inside heads, C, outside heads, E, bottom cross-pieces, D, and end pieces, F, constructed and arranged substantially as and for the purpose shown and set forth.

In testimony whereof I affix my signature in presence of two witnesses.

HARVEY NEWTON REID.

Witnesses:
R. N. MITCHELL,
H. I. BAIRD.